United States Patent [19]

Liu

[11] Patent Number: 5,544,988
[45] Date of Patent: Aug. 13, 1996

[54] WORKING TABLE ASSEMBLY FOR A DRILLING MACHINE

[76] Inventor: Chang H. Liu, No. 293 Shiang-Yang Road, Feng-Yuan City, Taichung Hsien, Taiwan

[21] Appl. No.: 495,899

[22] Filed: Jun. 28, 1995

[51] Int. Cl.[6] .............................. B23Q 1/04; B23B 47/00
[52] U.S. Cl. .............................. 408/90; 408/87; 408/234; 409/224; 451/414; 269/309
[58] Field of Search .................................. 408/87, 89–91, 408/234; 409/219, 224; 451/414; 269/309; 108/5, 6, 8; 142/49

[56] References Cited

U.S. PATENT DOCUMENTS

| | | | |
|---|---|---|---|
| 54,248 | 4/1866 | Eddy ........................................ | 408/87 |
| 1,240,474 | 9/1917 | Moore et al. ............................. | 142/49 |
| 1,499,459 | 7/1924 | Hartmann ................................. | 408/90 |
| 4,118,141 | 10/1978 | Spohn, Jr. ................................ | 408/90 |

*Primary Examiner*—Steven C. Bishop
*Attorney, Agent, or Firm*—Morton J. Rosenberg; David I. Klein

[57] ABSTRACT

A working table includes a lateral beam having one end for securing to a drilling machine and having a longitudinal channel for slidably engaging with a bolt which is extended downward from a block. A nut is threadedly engaged with the bolt so as to secure the block to the lateral beam. A table is rotatably secured to the block by a screw. The table and the block are movable along the channel and are rotatable relative to the lateral beam when the nut is unthreaded relative to the bolt. The table may be rotated relative to the block when the screw is unthreaded relative to the block.

3 Claims, 6 Drawing Sheets

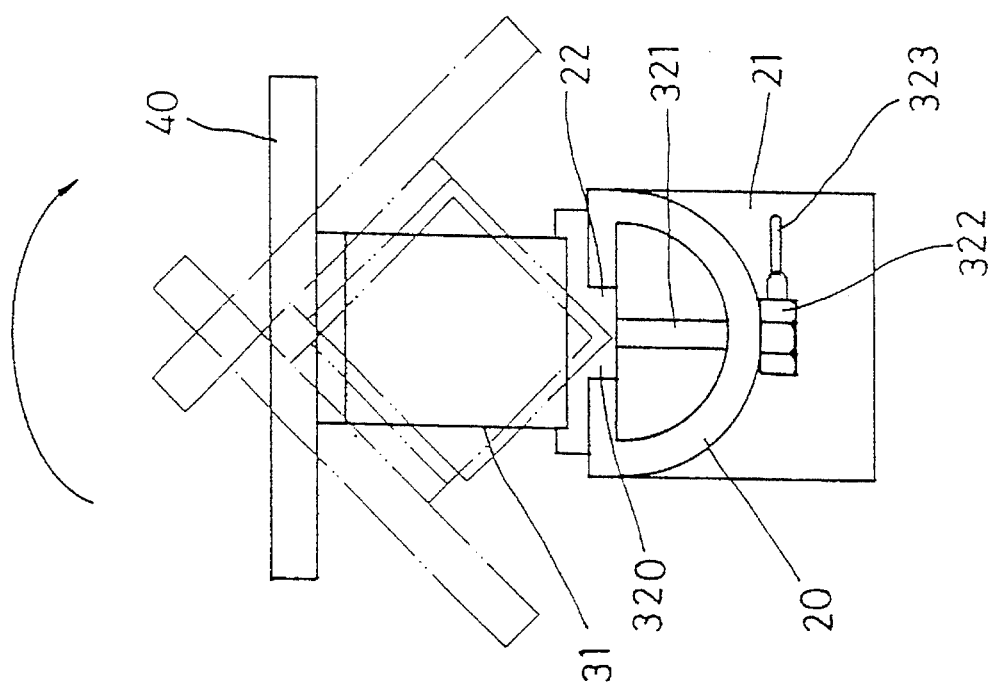

WORKING TABLE ASSEMBLY FOR A DRILLING MACHINE

BACKGROUND OF THE INVENTION

1. Field of the Invention

The present invention relates to a working table, and more particularly to an adjustable working table assembly for a drilling machine.

2. Description of the Prior Art

Typical drilling machines comprise a working table that are stably supported in the lower portion for supporting work pieces thereon. The working tables may not be easily adjusted for supporting various kinds of work pieces.

The present invention has arisen to mitigate and/or obviate the afore-described disadvantages of the conventional working tables of drilling machines.

SUMMARY OF THE INVENTION

The primary objective of the present invention is to provide an adjustable working table assembly for a drilling machine in which the working table may be easily adjusted to suitable position according to the users' need.

In accordance with one aspect of the invention, there is provided a working table assembly for a drilling machine comprising a lateral beam including a first end for securing to the drilling machine and including a channel means longitudinally formed therein, a block including a bolt means extended downward therefrom and slidably engaged in the channel means, the block including an extension extended therefrom, the extension including a free end portion having a first disc secured thereto, a first fastening means threadedly engaged with the bolt means so as to secure the block to the lateral beam, a stud including a first end having a second disc secured thereto and engaged with the first disc, and including a second end having a sleeve secured thereto, a second fastening means threadedly engaged with the first and second discs so as to secure the first and second discs together, and a table including a shaft extended downward therefrom and engaging with the sleeve so as to be secured to the sleeve. The table and the block are moved along the channel means and are rotated relative to the lateral beam about the bolt means when the first fastening means is unthreaded relative to the bolt means so as to adjust the table to a suitable position. The table and the stud are rotated relative to the block when the second fastening means is unthreaded relative to the first and second discs.

Further objectives and advantages of the present invention will become apparent from a careful reading of a detailed description provided hereinbelow, with appropriate reference to accompanying drawings.

BRIEF DESCRIPTION OF THE DRAWINGS

FIG. 6 is a schematic view illustrating the rotational operation of the adjustable working table assembly.

DETAILED DESCRIPTION OF THE PREFERRED EMBODIMENT

Figure 1:
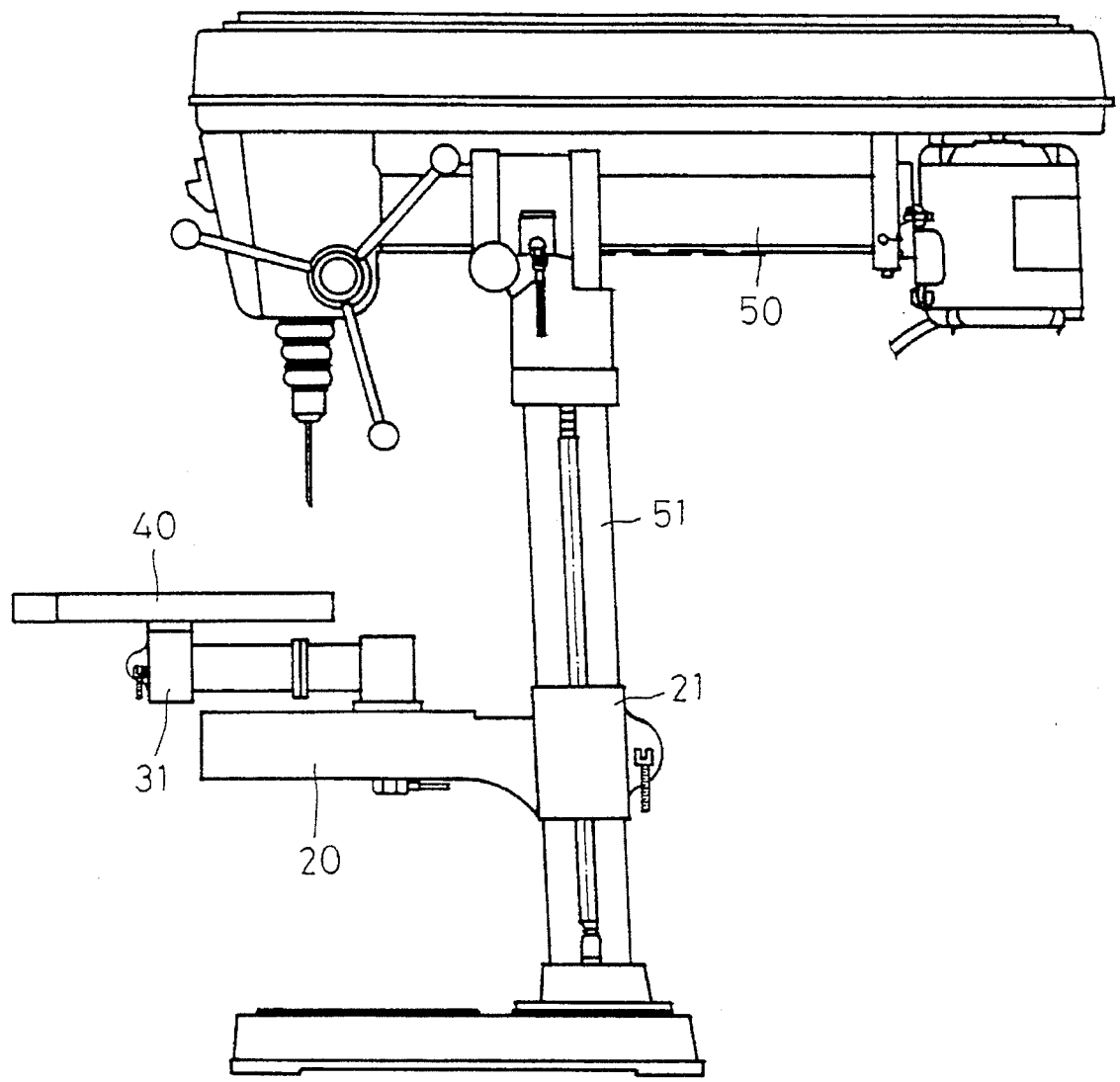
FIG. 1 is an elevational view of a drilling machine which employs an adjustable working table assembly in accordance with the present invention.
Figure 2:
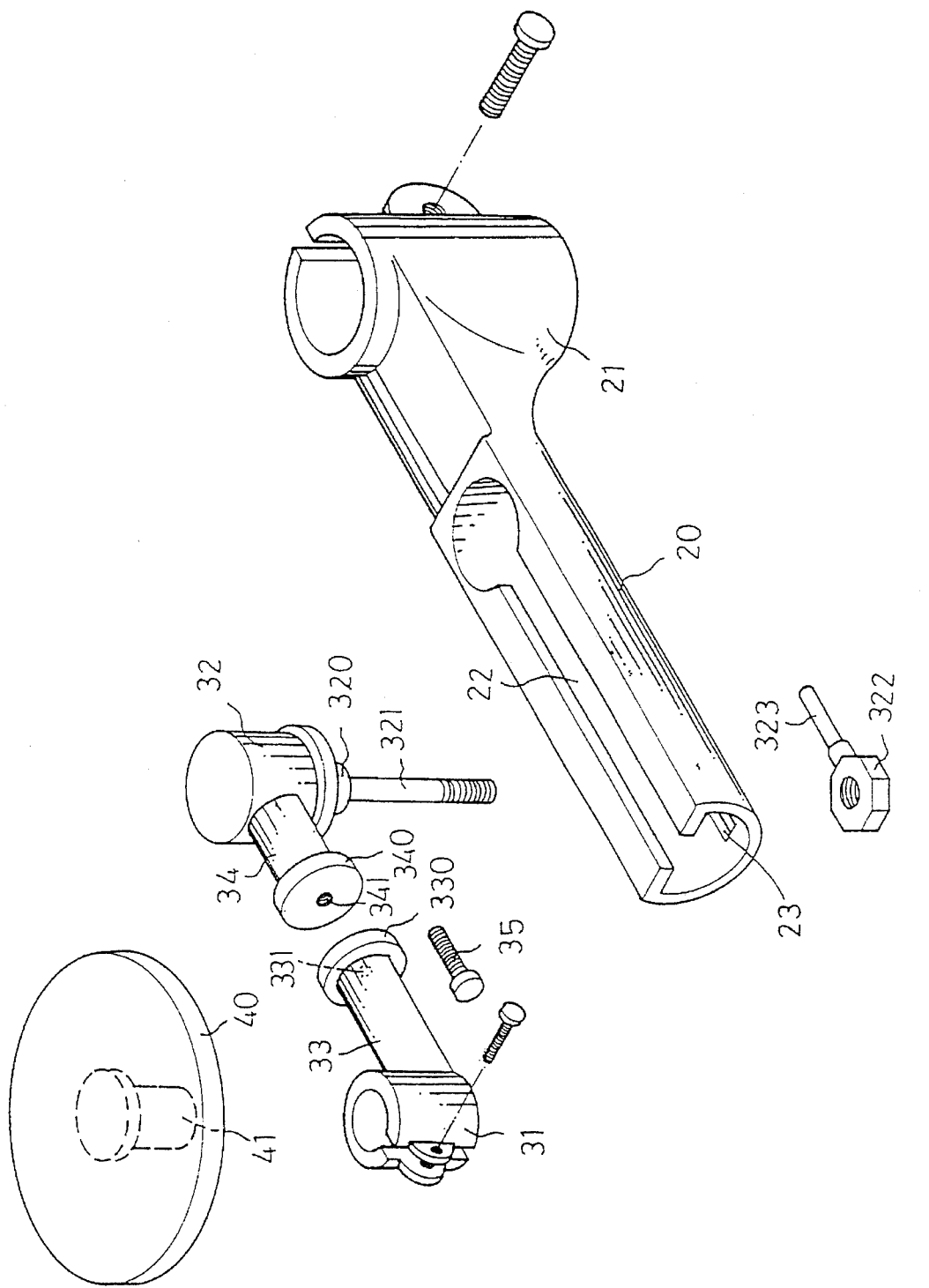
FIG. 2 is an exploded perspective view of an adjustable working table assembly in accordance with the present invention.
Figure 3:
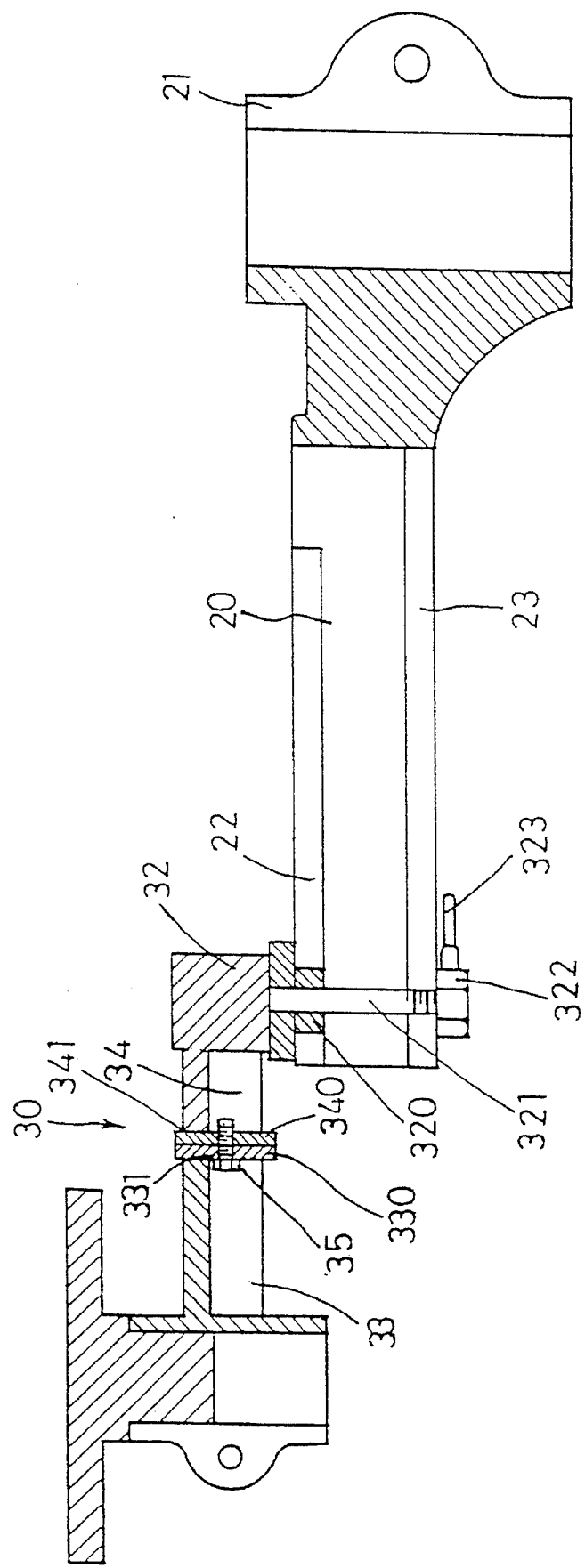
FIG. 3 is a cross sectional view of the adjustable working table assembly.

Referring to the drawings, and initially to FIGS. 1 to 3, an adjustable working table assembly in accordance with the present invention is provided for a drilling machine which comprises a post 51 having a drilling mechanism 50 supported on top thereof. The adjustable working table assembly comprises a lateral beam 20 including a barrel 21 provided on one end for engaging with and for securing to the post 51 of the drilling machine. The lateral beam 20 is arranged in a horizontal position and includes a channel 22 longitudinally formed in the upper portion and a slot 23 longitudinally formed in the lower portion thereof.

A block 32 includes a projection 320 extended from the bottom portion for slidably engaging with the channel 22 and includes a bolt 321 extended downward from the projection 320 for slidably engaging with the slot 23. A nut 322 is threadedly engaged with the bolt 321 so as to secure the block 32 to the lateral beam 20 and includes a handle 323 secured thereto for rotating the nut 322. The block 32 includes an extension 34 extended therefrom and having a disc 340 secured to the free end thereof. A stud 33 includes a disc 330 secured to one end thereof and engaged with the disc 340, and includes a sleeve 31 secured to the other end for engaging with a shaft 41 which is extended downward from a table 40. The discs 340, 330 each includes a screw hole 341, 331 formed therein for engaging with a screw 35 which may stably secure the stud 33 to the extension 34. The extension 34 and the stud 33 each includes a semi-circular cross section having an open bottom for engaging the screw 35 with the screw holes 331, 341 of the discs 33, 34.

Figure 4:
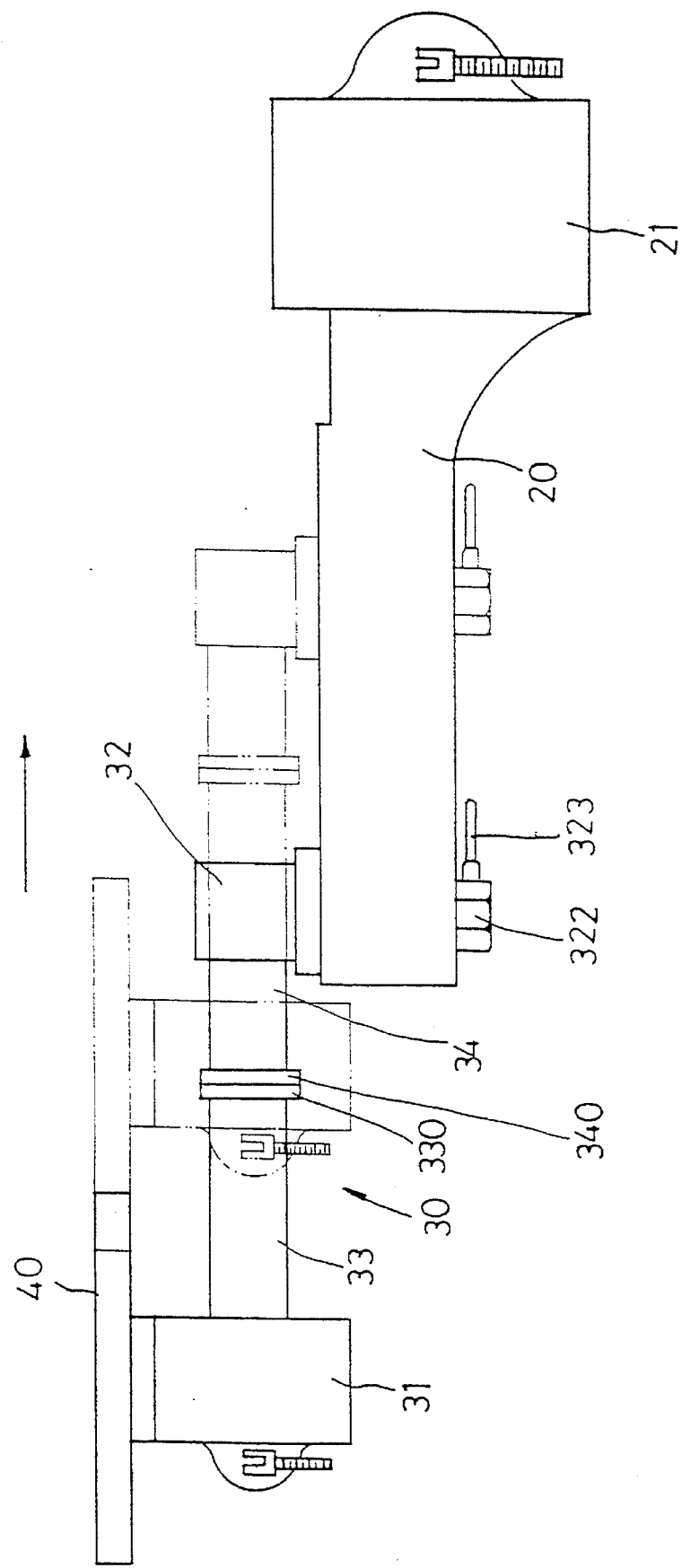
FIG. 4 is an elevation view illustrating the operation of the adjustable working table assembly.
Figure 5:
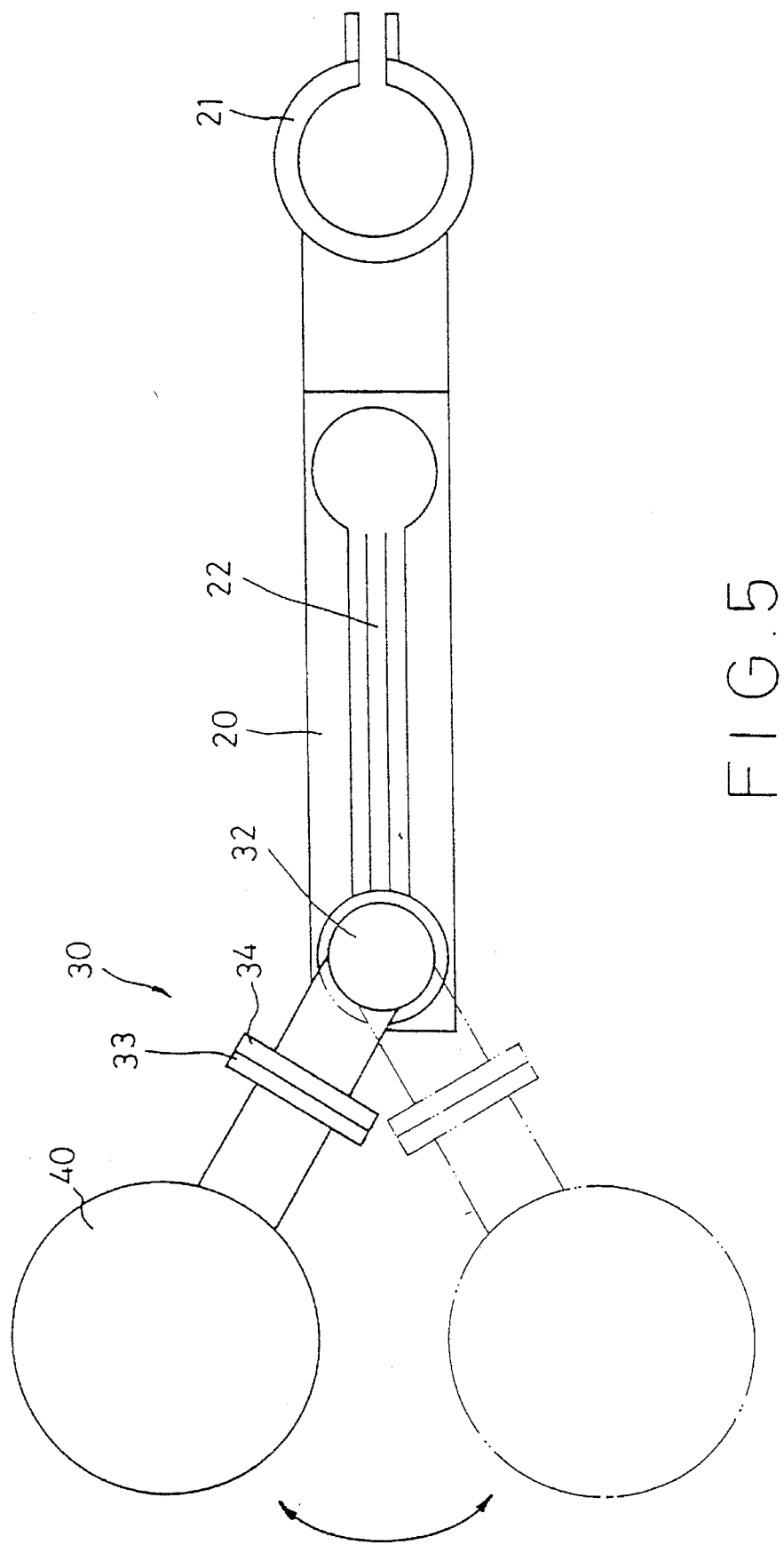
FIG. 5 is a plan view illustrating the operation of the adjustable working table assembly.

In operation, as shown in FIG. 4, when the nut 322 is unthreaded relative to the bolt 321 by the handle 323, the block 32 may be slided along the channel 22 so as to adjust the table 40 longitudinally along the lateral beam 20. As shown in FIG. 5, when the nut 322 is unthreaded relative to the bolt 321, the block 32 and the stud 33 may be rotated relative to the lateral beam 20 about the bolt 321 and may be rotated to suitable angular position and may be secured in the angular position when the nut 322 is threaded relative to the bolt 321 again. As shown in FIG. 6, when the screw 35 is unthreaded relative to the screw holes 331, 341, the table 40 may be rotated relative to the block 32 about the screw 35 to suitable angular position.

It is to be noted the bolt 321 may be guided to slide along the channel 22 when the nut 322 is unthreaded relative to the bolt. At this moment, the table 40 may also be stably supported on and secured to the block 32 and the block 32 may also be stably supported on the lateral beam 20 such that the users need not hold the table 40.

Accordingly, the adjustable working table assembly includes a table that may be adjusted longitudinally along the lateral beam, and may be rotated horizontally relative to the lateral beam, and may be rotated relative to the block to suitable angular position.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A working table assembly for a drilling machine comprising:

a lateral beam including a first end for securing to the drilling machine and including a channel means longitudinally formed therein, a block including a bolt means extended downward therefrom and slidably engaged in said channel means, said block including an extension extended therefrom, said extension including a free end portion having a first disc secured thereto, a first fastening means threadedly engaged with said bolt means so as to secure said block to said lateral beam, a stud including a first end having a second disc secured thereto and engaged with said first disc, and including a second end having a sleeve secured thereto, a second fastening means threadedly engaged with said first and second discs so as to secure said first and second discs together, and a table including a shaft extended downward therefrom and engaging with said sleeve so as to be secured to said sleeve, said table and said block being moved along said channel means and being rotated relative to said lateral beam about said bolt means when said first fastening means is unthreaded relative to said bolt means so as to adjust said table to a suitable position, and said table and said stud being rotated relative to said block when said second fastening means is unthreaded relative to said first and second discs.

2. A working table assembly for a drill press comprising:

(a) an elongate lateral beam extending in a lateral direction and having first and second ends, said first end being secured to a portion of said drill press, said lateral beam having formed therein an elongate channel extending in a direction substantially parallel to said lateral direction;

(b) a block member adjustably coupled to said lateral beam, said block member having projecting therefrom bolt means for slidable insert in said channel of said lateral beam, said block member being linearly displaceable relative to said lateral beam and angularly displaceable relative to at least a portion of said lateral beam about an axis extending substantially normal to said lateral direction;

(c) fastening means releasably coupled to said bolt means for securing said block member to said lateral beam; and, (d) a table assembly adjustably coupled to said block member, said table assembly being angularly displaceable about said lateral direction relative to said block member.

3. A working table assembly for a drill press comprising:

(a) an elongate lateral beam extending in a lateral direction and having first and second ends, said first end being secured to a portion of said drill press, said lateral beam having formed therein an elongate channel extending in a direction substantially parallel to said lateral direction;

(b) a block member adjustably coupled to said lateral beam, said block member having projecting therefrom bolt means for slidable insert in said channel of said lateral beam, said block member being linearly displaceable relative to said lateral beam and angularly displaceable relative to at least a portion of said lateral beam about an axis extending substantially normal to said lateral direction;

(c) fastening means releasably coupled to said bolt means for securing said block member to said lateral beam;

(d) a sleeve member coupled to said block member to be angularly displaceable relative thereto about said lateral direction; and, (d) a table member coupled to said sleeve member, said table member having a shaft portion projecting therefrom for securely engaging at least a portion of said sleeve member.

* * * * *